United States Patent

Robinson et al.

[15] 3,669,957

[45] June 13, 1972

[54] PROCESS FOR THE PREPARATION OF SODIUM AMPICILLIN

[72] Inventors: Charles A. Robinson, 1402 Carroll Brown Way; Arthur C. Adams, 255 Elmwood Avenue, both of West Chester, Pa. 19380

[73] Assignee: American Home Products Corporation, New York, New York.

[22] Filed: April 24, 1970

[21] Appl. No.: 29,750

Related U.S. Application Data

[63] Continuation of Ser. No. 699,776, Jan. 23, 1968.

[52] U.S. Cl. ...................................................260/239.1
[51] Int. Cl. ......................................................C07d 99/16
[58] Field of Search ............................................260/239.1

[56] References Cited

UNITED STATES PATENTS

| | | | |
|---|---|---|---|
| 3,262,928 | 7/1966 | Granatek | 260/239.1 |
| 3,534,035 | 10/1970 | Nescio | 260/239.1 |

*Primary Examiner*—Nicholas S. Rizzo
*Attorney*—Andrew Kafko

[57] ABSTRACT

A process for producing sodium ampicillin in crystalline form by first preparing the soluble diethylamine salt of ampicillin by the reaction of anhydrous ampicillin with diethylamine in methylene chloride, adding thereto a methylene chloride solution of sodium 2-ethylhexanoate, and then obtaining high yields of high purity sodium ampicillin in crystalline form by adding acetonitrile to the mixture.

7 Claims, No Drawings

3,669,957

PROCESS FOR THE PREPARATION OF SODIUM AMPICILLIN

This application is a continuation of application 699,776 filed on Jan. 23, 1968.

BACKGROUND OF THE INVENTION

It is already known that sodium ampicillin in crystalline form is useful for preparing potent antibiotic solutions suitable for parenteral administration upon reconstitution of said crystalline form in an aqueous medium, and a number of procedures have been proposed for preparing said sodium ampicillin in crystalline form.

For example, in British Patent Specification No. 980,240 there is disclosed a process for the preparation of alkali metal salts of ampicillin (including sodium ampicillin) comprising the preparation of a trialkylamine salt of ampicillin in an organic solvent, followed by reaction with an alkali metal salt of a carboxylic acid.

U.S. Pat. No. 3,262,928 discloses a process similar to that disclosed in said British Patent Specification 980,240. However, the process of U.S. Pat. No. 3,262,928 is limited to the use of the triethylamine salt of ampicillin and an alkali metal 2-ethylhexanoate in substantially anhydrous methylene chloride. To obtain a satisfactory product by this procedure, the moisture content of the methylene chloride solution of the triethylamine salt of ampicillin must be no less than 0.4 percent and no more than 0.2 percent. Moisture present in excess of 0.2 percent is stated to result in products of unsatisfactory potency, while a moisture content of less than 0.4 percent affords a product in undesirable colloidal state, which make recovery of the product difficult.

British Patent Specification No. 1,060,034 discloses a process for preparing alkali metal salts of ampicillin by reacting the triethylamine salt of ampicillin with an alkali metal alkoxide.

South African Patent application No. 67/1022 discloses the use of primary or secondary amines, cycloaliphatic amines, and heterocyclic amines for preliminary preparation of the amine salt of ampicillin, in conjunction with various reagents such as sodium iodide, sodium methoxide, and the like for reaction with the amine salt of ampicillin to obtain the desired sodium ampicillin.

Each of the above known procedures for preparing sodium ampicillin has one or more of the undesirable disadvantages of affording low yields, low purity and/or lack of desired crystalline form, or require prolonged dissolution and/or filtration periods. Moreover, the process of U.S. Pat. No. 3,262,928 requires close control of the moisture content of the solution of triethylamine salts of ampicillin used in the method, whereas the processes of British Patent Specification No. 1,060,034 and South African Patent application No. 67/1022 require the use of alkoxides or inorganic salts which introduce undesirable contaminating ions or groups in the process solutions. Slowness of precipitation of the ultimately desired sodium ampicillin salt is also inherent in the prior art processes coupled with the fact that the particle size of the precipitate may be so small that recovery by filtration is also slow and difficult.

With the foregoing disadvantages and drawbacks of the prior art processes in mind, it is a primary object of the present invention to provide an improved process for the preparation of sodium ampicillin, whereby high yields of high purity sodium ampicillin in desirable crystalline form is obtained by a relatively simple, practical process.

It is a corollary object of the present invention to provide such a process wherein the preliminary amine salt of ampicillin utilized is solubilized in methylene chloride quite rapidly.

It is another object of the invention to provide a process wherein the reagent for forming the ultimate sodium ampicillin is derived from a carboxylic acid, thereby not to introduce undesirable contaminants in the reaction mixture.

It is another object of the invention to provide the aforesaid method, which also results in rapid precipitation of the ultimate product in a crystalline particle size which permits ready recovery by conventional filtration techniques.

The foregoing and other objects and advantages of the invention, will become apparent from the description of the invention which now follows.

DESCRIPTION OF THE INVENTION

This invention relates generally to a chemical process, and more particularly to a process for the preparation of sodium ampicillin from an ampicillin precursor. In its broadest aspect, the invention comprises a method wherein ampicillin anhydrous is mixed with a solution containing an excess of diethylamine in methylene chloride, approximately a molar equivalent of sodium 2-ethylhexanoate is added to the solution containing the diethylamine salt of ampicillin, substantially anhydrous acetonitrile is added to the resulting solution, and crystalline sodium ampicillin is then collected from the final solution by filtration.

Preferably, in the procedure described above, an excess of diethylamine is utilized for treating the ampicillin anhydrous and the mixing is undertaken preferably at 0°–5° C. The resulting solution can be treated with charcoal and/or filtered if required. The sodium 2-ethylhexanoate, on introduction to the solution containing the diethylamine salt of ampicillin is preferably added gradually at a temperature of from 0°–5° C. The acetonitrile is preferably added to the solution at a temperature of 0°–10° C., and most preferably at 0°±1° C. Crystallization may then be initiated by seeding, if necessary. After stirring at 0°–15° C. and preferably at 0°–10° C., for 1½ hours or until crystallization is complete, the crystalline product, after collection by filtration, is preferably washed with methylene chloride and then dried in a vacuum at ambient temperature.

As is already known, sodium ampicillin in crystalline form is useful for preparing potent antibiotic solutions suitable for parenteral administration by reconstitution or dissolution of the crystalline form in anaqueous medium.

The following examples set forth specific embodiments of the invention which illustrate preferred modes of use of the process and the advantages obtained thereby.

EXAMPLE 1

In a 3 L. 3-neck flask fitted with stirrer, thermometer, and dropping funnel with drying tube, 122.5 g. (0.35 mole) of ampicillin anhydrous in 1,600 ml. of methylene chloride was cooled to 0°–2° C., and 38.3 g. (0.52 mole) of diethylamine was added over about 3 minutes. After stirring for 10 minutes the solution was clarified by filtration.

A solution of sodium 2-ethylhexanoate was prepared by adding 18.9 g. (0.35 mole) of freshly-opened sodium methoxide to a cold solution of 55.3 g. (0.38 mole) of 2-ethylhexanoic acid in 490 ml. of methylene chloride with stirring. The resulting clear solution was added to the solution containing the diethylamine salt of ampicillin in a 5 L. 3-neck flask fitted with stirrer, thermometer, dropping funnel, and drying tube, over one-half hour at 0°–3° C.

Then, 1,400 ml. of acetonitrile was added to the clear solution over 25 minutes with slow stirring allowing the temperature to rise to 10° C. Crystallization began after half of the acetonitrile had been added and was allowed to continue for 1½ hours at 10°–12° C. The product was collected by filtration, washed twice with 200 ml. of methylene chloride, and dried in vacuum at room temperature; yield, 105 g. or 81 percent of theory; bioassay, 880 mcg. per mg. expressed as ampicillin; pH of 1 percent solution of final product 9.2.

EXAMPLE 2

In a 3 L. 3-neck flask fitted with stirrer, thermometer and dropping funnel with drying tube, 122.5 g. of ampicillin anhydrous in 1,600 ml. of methylene chloride was treated with 38.3 g. of diethylamine at 0°–2° C. After stirring for 5 minutes, 12 g. of dry charcoal was added to the clear solution and the mixture allowed to stir at 0°–3° C. for 1 hour. Filtration through dry filter-aid afforded a clear, colorless solution.

A solution of sodium 2-ethylhexanoate was prepared by adding 20.8 g. (0.39 mole) of freshly-opened sodium methoxide to a cold solution of 60.6 g. (0.42 mole) of 2-ethylhexanoic acid in 490 ml. of methylene chloride. After clarification by filtration, this solution was added to the reaction mixture over one-half hour at 0°–3° C. and the procedure was continued as described in Example 1; yield, 112 g. or 86 percent of theory; bioassay 988 mcg. per mg. expressed as ampicillin.

EXAMPLE 3

The procedure of Example 1 was followed except that the acetonitrile was added over 25 minutes at 0°±1° C., and then slow stirring was continued at 0°±1° C. for three hours. Crystalline sodium ampicillin was obtained in 82 percent yield.

We claim:

1. A process for the preparation of sodium ampicillin which comprises:
    admixing anhydrous ampicillin with an excess of diethylamine in methylene chloride to form a solution of the diethylamine salt of ampicillin;
    admixing with said solution an approximately molar equivalent of sodium 2-ethylhexanoate;
    admixing with the resulting solution, substantially anhydrous acetonitrile for crystallizing the sodium ampicillin therein; and
    following crystallization of sodium ampicillin from the final mixture, collecting the crystalline product by filtration.

2. A process for the preparation of sodium ampicillin as claimed in claim 1, wherein the admixing of the anhydrous ampicillin, diethylamine, and sodium 2-ethylhexanoate is undertaken at a temperature within the range of from about 0° to about 5° C.

3. A process for the preparation of sodium ampicillin as claimed in claim 2, wherein the acetonitrile is added to the solution at a temperature of from about 0° C. to about 10° C.

4. A process for the preparation of sodium ampicillin as claimed in claim 3, wherein the mixture is stirred at a temperature of from about 0° C. to about 15° C. until crystallization is complete.

5. A process for the preparation of sodium ampicillin as claimed in claim 4, wherein the acetonitrile is added at a temperature of 0°±1° C. and the stirring is undertaken at 0°±1° C.

6. A process for the preparation of sodium ampicillin as claimed in claim 5, wherein the crystals of sodium ampicillin, after collection by filtration, are washed with methylene chloride and then dried in a vacuum at ambient temperature.

7. A process for the preparation of sodium ampicillin as claimed in claim 6, wherein crystallization is initiated by seeding with crystals of sodium ampicillin.

* * * * *

UNITED STATES PATENT OFFICE
CERTIFICATE OF CORRECTION

Patent No. 3,669,957      Dated July 13, 1972

Inventor(s) Charles A. Robinson

It is certified that error appears in the above-identified patent and that said Letters Patent are hereby corrected as shown below:

Column 1, lines 27 and 30, "0.4 per cent" should read -- 0.04 per cent --.

Column 2, line 39, "anaqueous" should read -- an aqueous --.

Signed and Sealed this

Twenty-first Day of September 1976

[SEAL]

Attest:

RUTH C. MASON
*Attesting Officer*

C. MARSHALL DANN
*Commissioner of Patents and Trademarks*